UNITED STATES PATENT OFFICE.

CHARLES CATLETT, OF STAUNTON, VIRGINIA.

OXYSALT COMPOSITION.

1,422,337.     Specification of Letters Patent.     Patented July 11, 1922.

No Drawing.     Application filed August 3, 1921.  Serial No. 489,608.

*To all whom it may concern:*

Be it known that I, CHARLES CATLETT, a citizen of the United States, residing at Staunton, county of Augusta, State of Virginia, have invented certain new and useful Improvements in Oxysalt Compositions; and I do hereby declare the following to be a full, clear, and exact description of the invention, such as will enable others skilled in the art to which it appertains to make and use the same.

This invention relates to oxysalt compositions, and more particularly to methods of preparing oxysalt compositions useful especially in connection with cement and concrete mixtures for the purpose of regulating the time of set and increasing the early time strengths of such mixtures.

In my prior Patent 1,282,188 of October 22, 1918, I have disclosed oxysalt compositions, and more particularly calcium oxychlorid compositions, useful especially for the purpose above mentioned, together with processes of preparing the same. The present invention provides other novel methods whereby such compositions may be advantageously prepared under some circumstances. In general, the methods of the present invention differ principally from those described in my prior patent in that the present methods do not involve the addition of water as such to the materials employed in making the oxysalt compositions, the water of constitution or crystallization contained in one or more of the ingredients, or the moisture introduced into the reaction mixture by reason of the hygroscopic properties of one or more of the materials employed, or both, being relied upon to provide the $H_2O$ requisite for the reaction in which the oxysalt is formed.

As calcium oxychlorid compositions are at present the most important of the oxysalt compositions for the particular purposes in view, the description of the novel process hereinafter given will deal specifically with the preparation of a calcium oxychlorid composition for purposes of illustrating the principles underlying the invention. The character of such a calcium oxychlorid composition and its method of employment in the industrial art are disclosed in my prior patent before mentioned and also in my prior Patent 1,308,932 of July 8, 1919; also in Technologic Paper No. 174 of the Bureau of Standards (Government Printing Office, Washington, 1920).

In preparing an oxychlorid composition of the character described, lime is caused to react with calcium chlorid in the presence of water. Where the water is added as such to a mixture of commercial lime and commercial calcium chlorid, as described in my prior Patent 1,282,188, the reaction is thereby greatly accelerated. It occurs also, however, when the materials are intimately commingled in suitably divided solid and relatively dry form by reason of the fact that the calcium chlorid contains about 25 per cent of $H_2O$ and the lime, if hydrated, contains approximately the same percentage. In the case of hydrated lime, most of this $H_2O$ is in the form of water of constitution. In the case of calcium chlorid the $H_2O$ is present probably partly as water of constitution and partly as mechanically held moisture due to the hygroscopic property of this substance. Whether the lime employed be initially hydrated or not, the moisture present in the mixture of the solid ingredients is sufficient to initiate the formation of calcium oxychlorid which progresses to substantial completion in a properly proportioned mixture, any necessary additional moisture being rapidly drawn from the atmosphere by reason of the hygroscopic nature of the calcium chlorid used.

In carrying out the process of the present invention, various specific procedures may be followed, some of which will now be briefly outlined.

According to one such procedure, commercial fused granular calcium chlorid and either quicklime (CaO) or partially hydrated lime are ground up together in the approximate proportions by weight of one part of calcium chlorid to two parts of lime. It is to be noted that the ingredients are mixed in solid form, that is, no water as such is added. After standing four or five days exposed to the atmosphere, an examination of the mixture shows that substantially the whole of it has been converted into calcium oxychlorid, whose presence is readily recognizable under the microscope by its characteristic crystal form. The mass has set in the sense that the reaction has gone to completion and has attained stable crystalline form. Some of the material is in the form of friable lumps, easily mashed between the thumb and finger, and a considerable proportion is in the form of fine powder. The mass is easily ground to a uniform powder, preferably fine enough to pass 100 mesh; this powder being substantially dry and capable of being kept for a long time in ordinary closed containers. The composition prepared in this manner is in general comparable to those described on page 3 of my prior Patent 1,282,188.

In another procedure embodying the principles of the invention, calcium chlorid flakes or granules, which are now obtainable commercially, and are in sufficiently finely divided form for use without further comminution, are mixed with commercial hydrated lime in proportions by weight that may vary from about 2 to 5 parts of the hydrated lime to one part of calcium chlorid. The hydrated lime is in the finely divided condition normally characterizing this material. A specific mixture that I have found advantageous in practice is made up in the proportion of 100 pounds of hydrated lime to 42 pounds of the flaked calcium chlorid. The ingredients having been thoroughly mixed, the mixture may be spread in a pile or couch 6 or 8 inches thick and allowed to stand for such time as may be necessary to bring about the attainment of the desired set or stable condition of crystallization. In the specific instance described, this condition is reached ordinarily in from about 2 to 3 days. It will be found that the material has caked into appreciable masses, which, however, are friable, substantially dry, and easily mashed down to a fine powder. It can be readily put through a mill with no difficulty in the way of clogging the grinder, screen, or air separator. An examination of the material shows that practically all of the calcium chlorid has been changed to oxychlorid. This was probably due partly to the direct action of the hydrate on the calcium chlorid by virtue of the water of crystallization or constitution held by each, together with a certain amount of free water which each held; and this was probably considerably helped by the absorption of moisture from the atmosphere. The composition obtained with a mixture proportioned as specifically mentioned above gives a calcium oxychlorid composition containing about 20 to 22 per cent of "available" calcium chlorid and is an excellent product from the standpoint of stability and handling in commercial packages.

In the specific illustrative procedures above described, the practice of allowing the initial mixture to stand for some time in order to attain its set or condition of stable crystallization has been found to afford desirable results in that it lessens any tendency of the material to pack together again and form lumps after having been ground to a fine powder. However, it is not to be inferred that the invention is limited to a procedure that includes this step. On the contrary, it is feasible to grind the initial mixture immediately without allowing it to stand for a prolonged period in the manner described. In thus grinding the mixture, the reduction of the reacting ingredients to extremely fine condition in the mill or grinder brings them into such intimate contact that the reaction occurs with comparative rapidity, conversion of a large proportion of the calcium chlorid into oxychlorid being readily apparent immediately after grinding. Where the reaction is not wholly completed by the time the ground mixture is discharged from the mill, it goes to completion within a comparatively short time thereafter, sometimes accompanied by the formation of occasional lumps in the ground material, which lumps are however friable and usually soft enough to be crumbled between the thumb and finger.

Calcium oxychlorid compositions prepared by any of the procedures above given by way of illustrative examples are relatively dry and are substantially stable under ordinary conditions of exposure to atmosphere. Upon prolonged exposure there is some absorption of carbon dioxid from the atmosphere and the pulverulent material becomes slightly damp; but there is no free chlorine given off nor is chlorine evolved upon treating the material with an organic acid, such as acetic acid, for example. The stability of these compositions is comparable with that of commercial lime hydrate, and in general they may be handled and shipped in a similar manner, being in fact comparable with the compositions obtained by the method disclosed in my aforesaid prior Patent 1,282,188.

What I claim is:

1. The process of preparing an oxychlorid composition of the character described which comprises commingling solid lime and solid calcium chlorid, both in finely divided form, under reacting conditions.

2. The process of preparing an oxychlorid composition of the character described, which comprises commingling lime and calcium chlorid in subdivided solid form but containing $H_2O$.

3. The process of preparing a composition containing an oxychlorid and useful as an addition to cement and concrete mixtures which comprises commingling commercial lime and commercial calcium chlorid in subdivided solid form.

4. The process of preparing a composition containing an oxychlorid and useful as an addition to cement and concrete mixtures which comprises commingling commercial lime and commercial calcium chlorid in solid form, and grinding.

5. The process of preparing a composition useful as an addition to cement and concrete mixtures which comprises commingling, in solid form, lime and calcium chlorid, both containing water of constitution or crystallization, and grinding.

6. The process of preparing a composition useful as an addition to cement and concrete mixtures which comprises commingling commercial lime and commercial calcium chlorid in subdivided solid condition, allowing the mixture to stand, and then pulverizing.

7. The process of preparing a composition useful as an addition to cement and concrete mixtures which comprises commingling finely divided hydrated lime and flaked or granulated calcium chlorid, both in solid form, and after an interval of at least about a day pulverizing the mixture.

8. The process of preparing a composition useful as an addition to cement and concrete mixtures, which comprises commingling finely divided hydrated lime and flaked or granulated calcium chlorid, both in solid form, in the approximate proportions by weight of from two to five parts of said hydrated lime to one part of said calcium chlorid, allowing the mixture to stand for at least a day, and then pulverizing the mixture.

9. The process of preparing an oxysalt composition of the character described, which comprises effecting reaction between a base and a hygroscopic salt of the same metal as the base, both in subdivided solid form, and reducing the resultant product to pulverulent condition.

In testimony whereof I hereunto affix my signature.

CHARLES CATLETT.